Aug. 18, 1964 J. H. LEE 3,144,805

RELEASABLE FASTENER HAVING RETAINING MEANS FOR A DRIVE NUT

Filed Dec. 18, 1961 2 Sheets-Sheet 1

INVENTOR.
JAMES H. LEE

BY R. E. Geauque

ATTORNEY

Aug. 18, 1964 J. H. LEE 3,144,805
RELEASABLE FASTENER HAVING RETAINING MEANS FOR A DRIVE NUT
Filed Dec. 18, 1961 2 Sheets-Sheet 2

INVENTOR.
JAMES H. LEE

BY R. E. Geauque
ATTORNEY

United States Patent Office
3,144,805
Patented Aug. 18, 1964

1

3,144,805

RELEASABLE FASTENER HAVING RETAINING MEANS FOR A DRIVE NUT

James H. Lee, Lawndale, Calif., assignor to Wedgelock Corporation of California, North Hollywood, Calif., a corporation of California
Filed Dec. 18, 1961, Ser. No. 160,365
1 Claim. (Cl. 85—81)

This invention relates to a releasable fastener and more particularly to a pin-type fastener for temporarily securing a plurality of perforated sheets of metal or the like while aligning perforations thereof.

This application is a continuation-in-part application of my co-pending application for a Releasable Fastener, Serial No. 115,149, filed June 6, 1961, and now abandoned.

In many industrial applications, two or more sheets are clamped together temporarily while other operations, like riveting or the like, are performed thereon to permanently secure the sheets. For this purpose, a fastener is preferably used to clamp the sheets together by insertion of fasteners in selected perforations of the skins to hold them together while the riveting operations are completed. Clamps of this type employ expandable pin members insertable through selected perforations of the skin which are expandable within the perforations to clamp the skins while aligning the perforations thereof.

This invention provides a new and improved releasable fastener having pin means protractable and retractable therefrom for engaging selected perforations of the skins to be clamped and expandable therein in response to protraction of the pins to clamp the skins with perforations thereof in alignment. This invention further provides means whereby the fastener is adapted to be operated by powered and clutched drive means, such as a powered nut runner attachment having torque control or by any suitable manually operable means.

More particularly, this invention includes a stud axially movable in a body which is adapted to be held by a tool such as the one referred to above for protracting and retracting pin means attached thereto; a nut member rotatable relative to the stud member and adapted to be driven by a driven portion of the nut runner attachment described above for imparting a linear movement to the stud; and means on the stud and cooperable with the nut rotatable on the stud, for retaining the nut on the stud in a freely rotating condition when the nut is retracted along the stud to release the clamping action.

It is therefore an object of this invention to provide a new and improved releasable fastener which includes pin means retractable and protractable therefrom for clamping a pair or more of sheets or skins together through aligned perforations thereof.

It is an object of this invention to provide a new and improved fastener which is operable by a driven nut runner device for more rapid operation thereof to clamp or unclamp the sheets.

A further object of this invention is to provide a releasable fastener in which means are provided for retaining a nut in freely rotating relationship when the nut means is rotated to release the fastener.

A still further object of this invention is to provide a new and improved fastener of the character described in which means are provided for preventing jamming of the nut when rotated by the driven or other means into a freely rotating position.

Yet another object of this invention is to provide a new and improved fastener which is economical to manufacture and capable of mass production.

A general object of this invention is to provide a new and improved releasable fastener of the character described which overcomes disadvantages of prior means and methods heretofore intended to accomplish generally similar purposes.

2

These and other objects of this invention will be more apparent from the following detailed description, drawings and appended claim.

Figure 1:
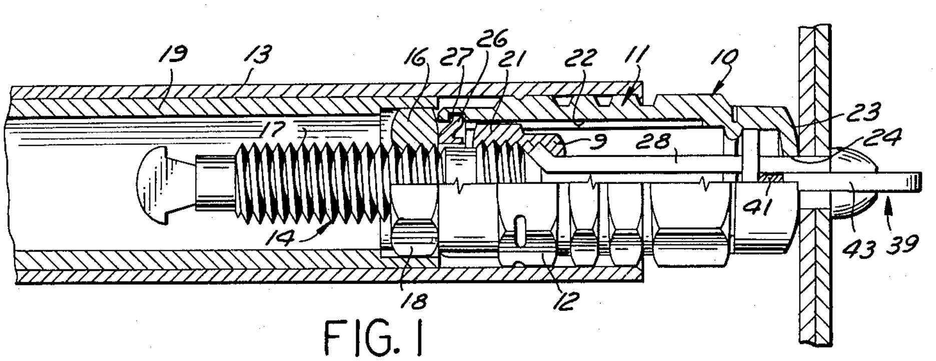
FIGURE 1 is a vertical, cross-sectional view as taken substantially along the center line of the fastener of this invention, with parts thereof shown in elevation.
Figure 2:
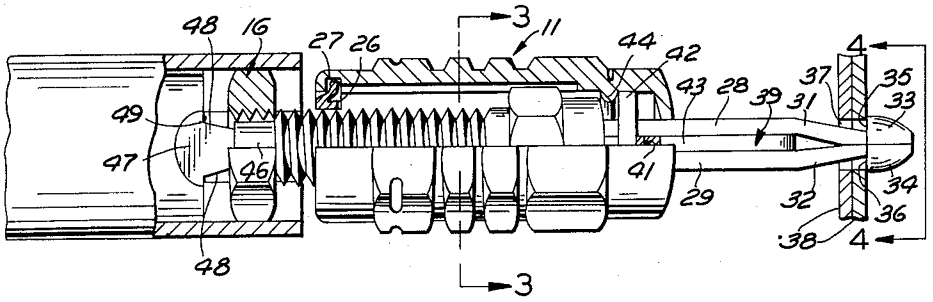
FIGURE 2 is a cross-sectional view, similar to FIGURE 1, illustrating portions thereof in changed position.
Figure 3:
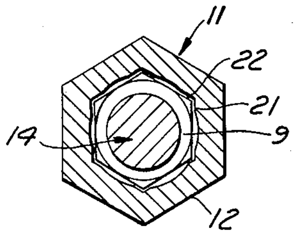
FIGURE 3 is a vertical, cross-sectional view as taken substantially along the line 3—3 of FIGURE 2.
Figure 5:
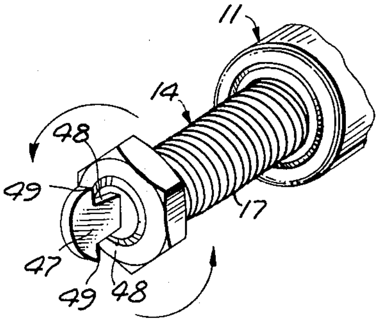
FIGURE 5 is a fragmentary, perspective view of the fastener of this invention.
Figure 4:
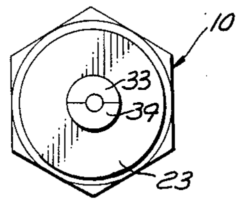
FIGURE 4 is an end view, in elevation, as viewed substantially along the line 4—4 of FIGURE 2 and omitting the skins.

Referring in detail to the drawings, and more particularly to FIGURES 1–6, inclusive, there is shown by way of illustration, but not of limitation, a first embodiment of a releasable fastener designed and constructed in accordance with this invention and generally designated by the numeral 10. The fastener 10 comprises a body 11 having a non-circular, tool-engaging outer configuration, as for example, the hexagonal outer surfaces 12 herein illustrated, so as to adapt the body 11 to be non-rotatably held as by the nut runner attachment referred to above, more specifically, an outer sleeve 13 thereof having an inner configuration complementary to the configuration 12. A stud member 14 is movably mounted in the body 11 for axial movement relative thereto. A nut member 16 is threadably engageable with external threads 17 on an intermediate portion of the stud 14, the nut means 16 having a non-circular, tool-engaging outer configuration indicated by the numeral 18 adapted to be engaged by an inner, rotatably driven sleeve 19 of the nut runner, supra, for axially moving the stud member 14 in response to rotation of the nut means 16 in one direction.

The stud member 14 is keyed to the body 11 by an enlarged head 9 having a non-circular portion 21 complementary to a non-circular inner bore 22 of the body 11. One end 23 of the body 11 is closed and acts as a work-engaging surface, the end 23 having an opening 24 extending therethrough, for a purpose to be hereinafter described. The opposite end of the body 11 is open and is provided with an annular bearing 26 seated in a groove 27 through which the stud member 14 is axially movable.

A pair of work-engaging pins 28 and 29 are each secured at one end to the head 9 for axial movement therewith. The pins 28 and 29 are in spaced parallel relationship, each having an outer end converging as at 31 and 32, respectively, and are enlarged at their outer extremities or tips 33 and 34, respectively, to provide inwardly facing shoulders 35 and 36, respectively. In the normal position of the FIGURE 2, the tips 33 and 34 are biased into juxtaposition so as to form a spherical exterior insertable through aligned apertures 37 of two or more sheets or skins 38.

Figure 6:
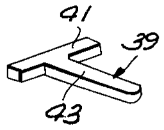
FIGURE 6 is a perspective view showing a spreader means thereof in greater detail.

A spreader means 39, as best seen in FIGURE 6, is T-shaped in configuration and is interposed between the pins 28 and 29 with its crossarm 41 disposed within the body, between the closed end 23 and a retaining washer 42 and its central arm 43 extending through the opening 24 and between the pins 28 and 29. The spreader 39 is held in this position by an internal annular flange 44 backing the washer 42 so as to prevent axial movement thereof.

As will now be more clearly understood from the foregoing description, the stud 14 is keyed to the body 11 by a sliding engagement of the head portion 21 in the bore 22 so as to protract or retract the pins 28 and 29 secured to the head 9. When the stud member 14 is bottomed in the body 11, the pins 28 and 29 have outer enlarged ends 33 and 34 juxtaposed and insertable as through aligned apertures 37 of the work-pieces 38. In response of rotation of the nut means 16 in one direction, the stud member 14 is axially retracted to the left, as viewed in FIGURES 1 and 2, to retract the pins 28 and 29 through the opening 24 of the work-engaging closed end 23. The central arm 43 of the T-shaped spreader means 39 acts upon the convergent portions 31, 32 of the pins to spread the ends 33 and 34 apart and increase the combined outer configuration to one larger than the openings 37 so as to abut the outer surface of the outer work-piece 38 by the shoulders 35 and 36, and, when fully retracted, clamp the skins 38 between the work-piece engaging enclosed end 23 and the shoulders 35, 36 as illustrated in FIGURE 1.

It has been found that in the use of driven nut runner attachments particularly when the nut means 16 is reversed so as to release the clamping action of the fastener (to the left as viewed in the drawings), a considerable speed of rotation is built up by the inertia of the nut means which may cause the nut to disengage the threaded portion 17 of the stud 14 under considerable force. For this purpose, an area at the end of the stud member opposite to the end having the pins secured thereto, is relieved as at 46 so that the nut means 16 may rotate freely after leaving the threads. Stop means 47 are provided adjacent to the free rotation portion of the stud for arresting linear movement of the nut. The stop means 47 includes a relatively flat end having tapered edges 48 terminating in opposing shoulders 49. The outer dimension of the stop portion 47 is preferably greater than the internal diameter of the threads of the nut 16 so as to prevent removal of the nut 16 whereas the tapered portions 48 are preferably so dimensioned that the nut 16 may freely rotate on the taper thereon and prevent jamming of the nut against the shoulders 49. In this manner, as the sleeve of the nut runner attachment 19 rotates the nut means 16 in a direction to retract the nut from the threads 17, the nut means freely rotates when it reaches the relieved area 46, without the necessity of a clutch means in the runner attachment and decreases speed on the tapered surfaces 48 without jamming thereon.

Although the fastener of the instant invention has been described in its preferred form, having a hexagonally configurated nut means 16, it is to be understood that other configurations may be efficiently used such as a wing nut, for example, if desired. The clutch means of the nut runner attachment provides means for limiting the torque applied to the nut 16 when the skins 38 are securely clamped between the shoulders 35, 36 and the end 23 of the body 11.

Referring in detail to FIGURES 7–10, inclusive, there is illustrated a preferred embodiment of this invention in which parts identical to the releasable fastener of the first embodiment are referred to by identical reference numerals, the instant embodiment being generally designated by the numeral 50. The fastener 50 comprises a body 11 having a non-circular, tool-engaging outer configuration as for example the hexagonal outer surface 12, herein illustrated, so as to adapt the body 11 to be non-rotatably held by a nut runner attachment as described in connection with the first embodiment.

A stud member 14′ is movably mounted in the body 11 for axial movement relative thereto similarly to the stud member 14 of the first embodiment. The stud 14′ is identical to the stud 14 of the first embodiment with the exception of stop means 51 provided on the outer end of the stud for retaining the nut 16 threaded intermediate of the threaded portions 17 of the stud 14 in a manner to be hereinafter described.

The nut member 16 is threadedly engageable with external threads 17 on an intermediate portion of the stud 14′, the nut means 16 having a non-circular, tool-engaging outer configuration indicated by the numeral 18 adapted to be engaged by an inner, rotatably driven sleeve 19 of the nut runner as described in connection with the first embodiment, for axially moving the stud member 14 relative to its body in response to rotation of the nut means 16 in one direction.

The stud member 14′ is keyed to the body 11, similarly to the stud member 14, by an enlarged head 9 having a non-circular portion 21 complementary to a non-circular inner bore 22 of the body 11. As in the first embodiment, one end 23 of the body 11 is closed and acts as a work-engaging surface, the end 23 having an opening 24 extending therethrough for a purpose to be hereinafter described. The opposite end of the body 11 is open and is provided with an annular bearing 26 seated in a suitable annular groove and in which the stud member 14 is axially movable.

Figure 7:
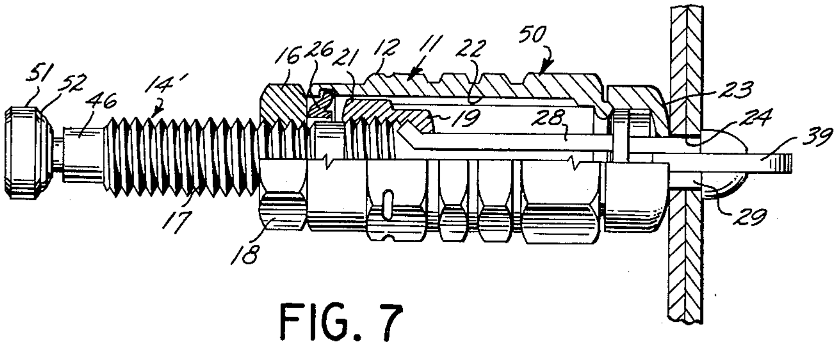
FIGURE 7 is a vertical, cross-sectional view as taken substantially along the longitudinal center of a modified fastener of this invention, with parts thereof shown in elevation.

A pair of work-engaging pins 28 and 29 are each secured at one end to the head 9 for axial movement therewith. The pins 28 and 29 operate as described in the first embodiment, in conjunction with a spreader means 39 so as to be selectively spread apart in response to movement of the stud 14′ in one direction for gripping a pair of work pieces 38 through aligned apertures 37 thereof to prevent movement therebetween. In response to rotation of the nut means 16 in one direction, stud member 14′ is axially retracted to the left, as viewed in FIGURES 7 and 8 to retract the pins 28 and 29 through the opening 24 of the work-engaging closed end 23. A central arm 43 of the T-shaped spreader means 39 acts upon convergent portions of the pins 28 and 29 to spread the ends thereof apart and increase the combined outer configuration to one larger than the openings 37 so as to abut the outer surface of the outer work piece 38 by shoulders thereof, and, when fully retracted, clamp the skins 38 between the work piece-engaging closed end and the shoulders of the pins, as illustrated in FIGURE 7.

As in the stud member 14 of the first embodiment, the stud member 14′ of the instant embodiment is circumferentially relieved at a portion 46 so that the nut means 16 may rotate freely thereon after being removed at a high speed from the thread 17 by a nut runner attachment as previously described.

Figures 8, 9, 10:
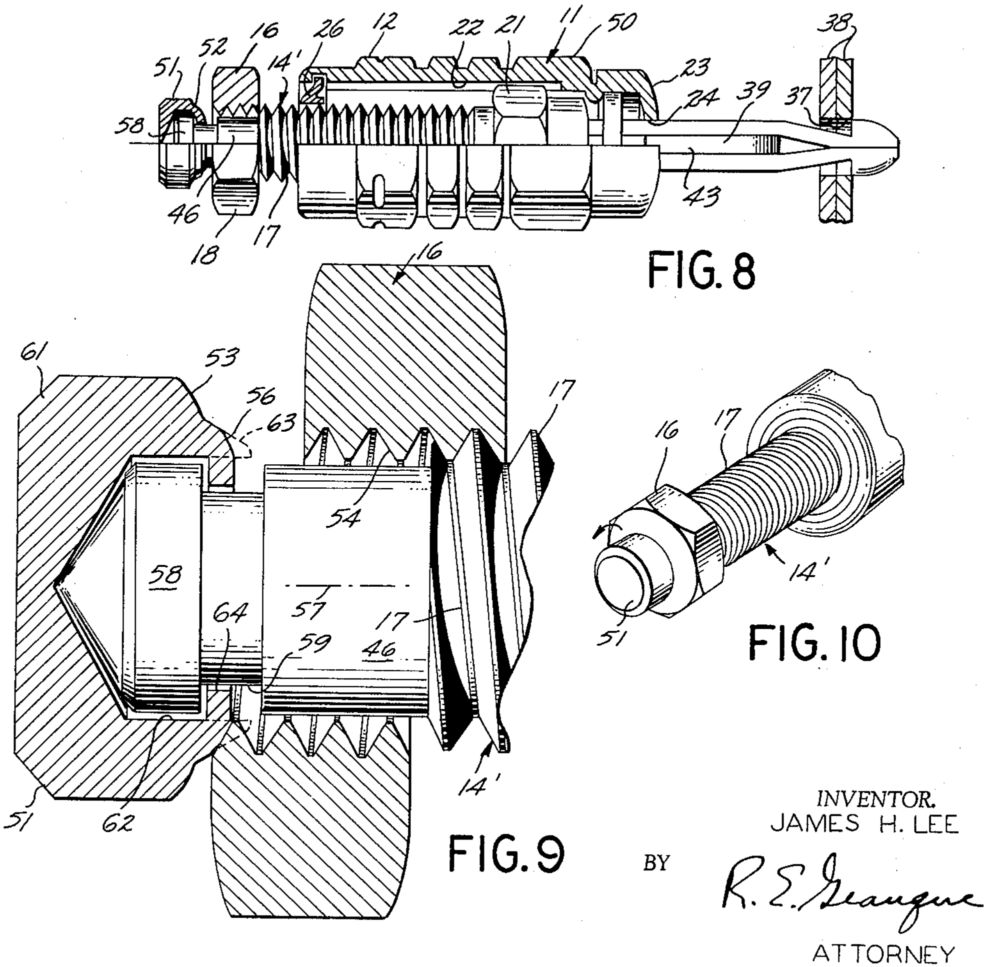
FIGURE 8 is a cross-sectional view, similar to FIGURE 7, illustrating portions thereof in change position.
FIGURE 9 is a fragmentary, enlarged, cross-sectional view of the left end portion of FIGURE 8 showing a retaining means thereof in greater detail and diagrammatically showing nut means thereof in two operating positions.
FIGURE 10 is a fragmentary, perspective view, of the left end of the fastener of FIGURES 7–9, inclusive.

In the instant embodiment, the stop means 51 provides an annular shoulder 52 adjacent to the relieved portion 46 of the stud member 14′ for arresting linear movement of the nut after it leaves the threaded portion 17. The stop means 51, as best seen in FIGURE 9, provides a first annular shoulder portion 53 which is frusto-conical and substantially coaxial to the longitudinal axis 57 of the stud 14′ and has a minimal diameter substantially larger than the maximum diameter of the internal threads 54 of the nut member 16. Co-extensive with the annular shoulder 53 is an annular, rounded shoulder portion 56 which, as best seen in FIGURE 9, engages the inner diameter of the thread 54 when the nut 16 is forcibly removed from the thread 17 so as to provide a surface which acts to retain the nut 16 in a plane substantially normal to the longitudinal axis 57 of the stud 14'.

The outer dimension of the stop member 51 is preferably greater than the internal diameter of the threads so as to prevent removal of the nut 16 whereas the shoulder portions 53 and 56 support the nut 16 in its spinning condition and hold the nut in a plane substantially normal to the axis 57 and substantially coaxial to the threads 17 of the stud 14' for retaining the nut in a freely rotating condition on the reduced portion 46 of the stud. In this manner, the nut 16 is prevented from jamming in an angular relationship to the axis 57 and is positioned ready to be re-engaged with the stud 14' for reuse therewith.

The stop member 51 is most practically secured to the stud member 14' as illustrated wherein an outermost end 58 of the stud member 14' is substantially equal in diameter to the reduced portion 46 and is separated from the portion 46 by an annular groove 59 of reduced annular dimension. The stop member 51 is preferably fabricated in the form of an annular body 61 of relatively-hard metallic material having a blind axial bore 62 to form initially an annular, outwardly-extending flange 63 (seen in broken lines in FIGURE 9). The flange 63 is subsequently spun, or otherwise formed, so as to form the annular shoulder 56 and an inwardly extending annular flange 64 engaging the groove 59 so as to retain the body 61 on the end 58. The flange 64 is spun so as to form an annular, substantially rounded configuration best seen in FIGURE 9 engageable by the nut 16 when it is disengaged from the thread 17 as previously described. Optionally, the stop member 51 may be integrally formed with the stud member 14' and milled or otherwise machined to be co-extensive with the reduced portion 46.

While there is herein shown and described what is conceived to be the most practical and preferred embodiments of this invention, it is recognized that departures may be made therefrom within the scope of this invention which is not limited to the details disclosed herein but is to be accorded the full scope of the claim so as to embrace any and all equivalent devices.

What is claimed as new and desired to secure by Letters Patent is:

In a releasable fastener including a body having a workpiece-engaging closed end, an axial opening extending through said closed end and a tool-engaging outer surface adapted to be non-rotatably supported by a tool, stud means movably mounted in said body for non-rotating axial movement relative to said body and having an externally threaded portion intermediate its ends, work-engaging pin means secured to one end of said stud means for linear movement therewith extending outwardly of said body, said pin means being protractable and retractable through said opening of said body, nut means engaging said threaded portion of said stud means and engageable with the end of said body which is remote from said closed end for selectively retracting said pin means in response to rotation of said nut means, said nut means having a tool-engageable outer surface adapted to be rotated by a power driven tool, and retaining means on said remote end of said stud means for preventing removal of said nut means from said stud means, the improvement comprising: a reduced portion intermediate said retaining means and said threaded portion of said stud means on which said nut means is freely rotatable, said retaining means including annular shoulder means on said remote end of said stud means, said shoulder means including a frusto-conical portion coaxial to the longitudinal axis of said stud means and spaced from said threaded portion thereof and having a diametric dimension substantially greater than the outer diameter of the threads on said nut means, a convexly rounded annular portion coextensive with and axially spaced from said frusto-conical portion and projecting rigidly therefrom toward said threaded portion to engage the inner diameter of the thread of the nut when the nut is forcibly removed from the threaded portion of the stud so as to provide a surface which retains the nut in a plane substantially normal to the longitudinal axis of the stud and spaced from said frusto-conical portion.

References Cited in the file of this patent

UNITED STATES PATENTS

| | | |
|---|---|---|
| 1,314,114 | Anderson | Aug. 26, 1919 |
| 1,398,731 | Lloyd | Nov. 29, 1921 |
| 2,397,849 | Engeln | Apr. 2, 1946 |
| 2,753,575 | Ingwer | July 10, 1956 |
| 2,775,155 | Tompkins | Dec. 25, 1956 |